US009860827B2

(12) United States Patent
Ji et al.

(10) Patent No.: US 9,860,827 B2
(45) Date of Patent: Jan. 2, 2018

(54) IDENTIFIER INTERACTION METHOD AND DEVICE

(71) Applicant: Huawei Technologies Co., Ltd., Shenzhen (CN)

(72) Inventors: Li Ji, Shanghai (CN); Hongzhuo Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/230,787

(22) Filed: Aug. 8, 2016

(65) Prior Publication Data
US 2016/0345241 A1 Nov. 24, 2016

Related U.S. Application Data

(63) Continuation of application No. PCT/CN2014/071905, filed on Feb. 8, 2014.

(51) Int. Cl.
*H04W 4/00* (2009.01)
*H04W 48/08* (2009.01)
(Continued)

(52) U.S. Cl.
CPC ............ *H04W 48/08* (2013.01); *H04W 8/02* (2013.01); *H04W 48/10* (2013.01); *H04W 48/16* (2013.01);
(Continued)

(58) Field of Classification Search
CPC ....... H04W 48/08; H04W 8/02; H04W 48/10; H04W 48/16; H04W 84/042; H04W 84/12; H04W 88/06
(Continued)

(56) References Cited

U.S. PATENT DOCUMENTS

| 8,942,221 B2* | 1/2015 | McCann | ............... H04W 48/12 370/349 |
| 9,380,494 B2* | 6/2016 | Sirotkin | ............... H04W 48/16 |

(Continued)

FOREIGN PATENT DOCUMENTS

| CN | 1968502 A | 5/2007 |
| CN | 101223804 A | 7/2008 |

(Continued)

OTHER PUBLICATIONS

3rd Generation Partnership Project; Technical Specification Group Services and System Aspects; WLAN Network Selection for 3GPP Terminals; Stage 2 (Release 12), 3GPP TR 23.865 V0.4.0 (Nov. 2012), pp. 1-18.

(Continued)

*Primary Examiner* — Marceau Milord
(74) *Attorney, Agent, or Firm* — Slater Matsil, LLP

(57) ABSTRACT

The present application discloses an identifier interaction method, comprising sending, by a 3GPP access network entity, an identifier of a wireless local area network (WLAN) to the user equipment according to the priority information of the WLAN, where the identifier of the WLAN is an identifier of a WLAN that a home area operator of a user equipment (UE) allows the UE to access and/or an identifier of a WLAN that a roaming area operator of the UE allows the UE to access, and the 3GPP access network entity is in a roaming area in which the user equipment is located.

20 Claims, 7 Drawing Sheets

(51) Int. Cl.
*H04W 48/10* (2009.01)
*H04W 8/02* (2009.01)
*H04W 48/16* (2009.01)
*H04W 84/04* (2009.01)
*H04W 84/12* (2009.01)
*H04W 88/06* (2009.01)

(52) U.S. Cl.
CPC .......... *H04W 84/042* (2013.01); *H04W 84/12* (2013.01); *H04W 88/06* (2013.01)

(58) Field of Classification Search
USPC ......... 455/432.1, 552.1, 435.1, 435.2, 435.3, 455/509, 512
See application file for complete search history.

(56) References Cited

U.S. PATENT DOCUMENTS

| | | | |
|---|---|---|---|
| 9,560,585 B2 * | 1/2017 | Forssell | H04W 48/16 |
| 9,648,555 B2 * | 5/2017 | Gupta | H04W 48/16 |
| 2012/0149366 A1 | 6/2012 | Mariblanca Nieves et al. | |
| 2014/0161103 A1 * | 6/2014 | Sirotkin | H04W 24/10 370/332 |
| 2014/0293982 A1 * | 10/2014 | Gupta | H04W 48/16 370/338 |
| 2014/0295913 A1 * | 10/2014 | Gupta | H04W 74/02 455/552.1 |
| 2014/0328193 A1 * | 11/2014 | Horn | H04W 24/00 370/252 |
| 2015/0092553 A1 * | 4/2015 | Sirotkin | H04W 48/16 370/235 |
| 2015/0282058 A1 * | 10/2015 | Forssell | H04W 48/18 455/552.1 |
| 2015/0351014 A1 * | 12/2015 | Jung | H04W 48/16 370/338 |
| 2016/0014667 A1 * | 1/2016 | Sirotkin | H04W 76/00 370/252 |
| 2016/0112943 A1 * | 4/2016 | Horn | H04W 8/065 370/329 |

FOREIGN PATENT DOCUMENTS

| | | |
|---|---|---|
| CN | 103503522 A | 1/2014 |
| CN | 103517370 A | 1/2014 |
| EP | 2757833 A1 | 7/2014 |
| WO | 2006133720 A1 | 12/2006 |
| WO | 2013134669 A1 | 9/2013 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 8), 3GPP TS 24.301 V8.1.0 (Mar. 2009), 250 pages.
Ericsson, "Handling of WLAN Identifiers," 3GPP TSG-RAN WG2 #85, Tdoc R2-140454, Prague, Czech Republic, Feb. 10-14, 2014, 6 pages.

* cited by examiner

IDENTIFIER INTERACTION METHOD AND DEVICE

CROSS-REFERENCE TO RELATED APPLICATIONS

This application claims the benefit International Application No. PCT/CN2014/071905, filed on Feb. 8, 2014, which application is hereby incorporated herein by reference.

TECHNICAL FIELD

Embodiments relate to the field of communications technologies, and specifically, to an identifier interaction method and a device.

BACKGROUND

A UE (user equipment) selects a non-3GPP (3rd Generation Partnership Project) network access point such as a WLAN (wireless local area network) according to a related policy delivered by a server in which UE subscription information is stored. In a scenario in which the UE roams to a roaming area, a WLAN deployed by a roaming area operator exists in the roaming area, and a WLAN deployed by a home area operator of the UE may further be included. The UE may preferentially access a WLAN that is not expected by the home area operator and/or the roaming area operator.

SUMMARY

Embodiments of the present invention disclose an identifier interaction method and a device, to prevent UE from preferentially accessing a WLAN that is not expected by a home area operator and/or a roaming area operator.

A first aspect of the embodiments provides an identifier interaction method. The method includes receiving, by a 3GPP access network entity, an identifier of a wireless local area network and priority information of the wireless local area network that are sent by a core network device of a roaming area operator, where the identifier of the wireless local area network is an identifier of a wireless local area network that a home area operator allows the user equipment to access and/or an identifier of a wireless local area network that a roaming area operator of the user equipment allows the user equipment to access, and the 3GPP access network entity is a 3GPP access network entity in a roaming area in which the user equipment is located. The method also includes sending, by the 3GPP access network entity, the identifier of the wireless local area network to the user equipment according to the priority information of the wireless local area network.

Based on the first aspect, in a first possible implementation manner of the first aspect, the priority information of the wireless local area network is used to indicate that a priority of the wireless local area network that the home area operator of the user equipment allows the user equipment to access is higher than a priority of the wireless local area network that the roaming area operator allows the user equipment to access, or the priority information of the wireless local area network is used to indicate that a priority of the wireless local area network that the home area operator of the user equipment allows the user equipment to access is lower than a priority of the wireless local area network that the roaming area operator allows the user equipment to access.

Based on the first aspect or the first possible implementation manner of the first aspect, in a second possible implementation manner of the first aspect, the sending, by the 3GPP access network entity, the identifier of the wireless local area network to the user equipment according to the priority information of the wireless local area network includes: determining, by the 3GPP access network entity, a priority of the wireless local area network according to the priority information of the wireless local area network; and sending, by the 3GPP access network entity to the user equipment, the identifier of the wireless local area network corresponding to the priority of the wireless local area network according to the priority of the wireless local area network.

Based on any one of the first aspect to the second possible implementation manner of the first aspect, in a third possible implementation manner of the first aspect, before the receiving, by a 3GPP access network entity, an identifier of a wireless local area network and priority information of the wireless local area network that are sent by the core network device, the method further includes: receiving, by the 3GPP access network entity, a service request or an attach request sent by the user equipment; and sending, by the 3GPP access network entity, the service request or the attach request to the core network device, so that the core network device sends the identifier of the wireless local area network and the priority information of the wireless local area network to the 3GPP access network entity according to the service request or the attach request.

Based on any one of the first aspect to the third possible implementation manner of the first aspect, in a fourth possible implementation manner of the first aspect, the receiving, by a 3GPP access network entity, an identifier of a wireless local area network and priority information of the wireless local area network that are sent by the core network device includes: receiving, by the 3GPP access network entity, an initial context setup request sent by the core network device, where the initial context setup request includes the identifier of the wireless local area network and the priority information of the wireless local area network.

A second aspect of the embodiments provides an identifier interaction method. The method includes receiving, by a core network device of a roaming area operator, a message used to trigger the core network device to send an identifier of a wireless local area network and priority information of the wireless local area network to a 3GPP access network entity, where the identifier of the wireless local area network is an identifier of a wireless local area network that a home area operator allows the user equipment to access and/or an identifier of a wireless local area network that a roaming area operator of the user equipment allows the user equipment to access, and the 3GPP access network entity is a 3GPP access network entity in a roaming area in which the user equipment is located. The method also includes responding, by the core network device, to the message, and sending the identifier of the wireless local area network and the priority information of the wireless local area network to the 3GPP access network entity, so that the 3GPP access network entity sends the identifier of the wireless local area network to the user equipment according to the priority information of the wireless local area network.

Based on the second aspect, in a first possible implementation manner of the second aspect, the priority information of the wireless local area network is used to indicate that a priority of the wireless local area network that the home area operator of the user equipment allows the user equipment to access is higher than a priority of the wireless local area network that the roaming area operator allows the user equipment to access, or the priority information of the wireless local area network is used to indicate that a priority of the wireless local area network that the home area operator of the user equipment allows the user equipment to access is lower than a priority of the wireless local area network that the roaming area operator allows the user equipment to access.

Based on the second aspect or the first possible implementation manner of the second aspect, in a second possible implementation manner of the second aspect, the message used to trigger the core network device to send the identifier of the wireless local area network and the priority information of the wireless local area network to the 3GPP access network entity includes: a service request that is from the user equipment and sent by the 3GPP access network entity; or a create session response sent by a data gateway.

Based on the second possible implementation manner of the second aspect, in a third possible implementation manner of the second aspect, the message used to trigger the core network device to send the identifier of the wireless local area network and the priority information of the wireless local area network to the 3GPP access network entity is the create session response sent by the data gateway, and the method further includes: receiving, by the core network device, an attach request that is from the user equipment and sent by the 3GPP access network entity; and sending, by the core network device, a create session request to the data gateway according to the attach request, so that the data gateway sends the create session response to the core network device.

A third aspect of the embodiments provides a 3GPP access network entity, the 3GPP access network entity is a 3GPP access network entity in a roaming area in which user equipment is located. The 3GPP access network entity includes a receiving unit, configured to receive an identifier of a wireless local area network and priority information of the wireless local area network that are sent by a core network device of a roaming area operator, where the identifier of the wireless local area network is an identifier of a wireless local area network that a home area operator allows the user equipment to access and/or an identifier of a wireless local area network that a roaming area operator of the user equipment allows the user equipment to access. Also included is a sending unit, configured to send the identifier of the wireless local area network to the user equipment according to the priority information of the wireless local area network.

Based on the third aspect, in a first possible implementation manner of the third aspect, the priority information of the wireless local area network is used to indicate that a priority of the wireless local area network that the home area operator of the user equipment allows the user equipment to access is higher than a priority of the wireless local area network that the roaming area operator allows the user equipment to access; or the priority information of the wireless local area network is used to indicate that a priority of the wireless local area network that the home area operator of the user equipment allows the user equipment to access is lower than a priority of the wireless local area network that the roaming area operator allows the user equipment to access.

Based on the third aspect or the first possible implementation manner of the third aspect, in a second possible implementation manner of the third aspect, that the sending unit is configured to send the identifier of the wireless local area network to the user equipment according to the priority information of the wireless local area network includes: the sending unit is specifically configured to determine a priority of the wireless local area network according to the priority information of the wireless local area network, and send, to the user equipment, the identifier of the wireless local area network corresponding to the priority of the wireless local area network according to the priority of the wireless local area network.

Based on any one of the third aspect to the second possible implementation manner of the third aspect, in a third possible implementation manner of the third aspect, the receiving unit is further configured to receive a service request or an attach request sent by the user equipment; and the sending unit is further configured to send the service request or the attach request to the core network device, so that the core network device sends the identifier of the wireless local area network and the priority information of the wireless local area network to the 3GPP access network entity according to the service request or the attach request.

Based on any one of the third aspect to the third possible implementation manner of the third aspect, in a fourth possible implementation manner of the third aspect, a manner in which the receiving unit receives the identifier of the wireless local area network and the priority information of the wireless local area network that are sent by the core network device is specifically that: the 3GPP access network entity receives an initial context setup request sent by the core network device, where the initial context setup request includes the identifier of the wireless local area network and the priority information of the wireless local area network.

A fourth aspect of the embodiments provides a core network device, where the core network device is a core network device of a roaming area operator to which user equipment roams. The core network device includes a receiving unit, configured to receive a message used to trigger the core network device to send, to a 3GPP access network entity in a roaming area in which the user equipment is located, an identifier of a wireless local area network and priority information of the wireless local area network, where the identifier of the wireless local area network is an identifier of a wireless local area network that a home area operator of the user equipment allows the user equipment to access. The core network device also includes a sending unit, configured to respond to the message, and send the identifier of the wireless local area network and the priority information of the wireless local area network to the 3GPP access network entity, so that the 3GPP access network entity sends the identifier of the wireless local area network to the user equipment according to the priority information of the wireless local area network.

Based on the fourth aspect, in a first possible implementation manner of the fourth aspect, the priority information of the wireless local area network is used to indicate that a priority of the wireless local area network that the home area operator of the user equipment allows the user equipment to access is higher than a priority of the wireless local area network that the roaming area operator allows the user equipment to access; or the priority information of the wireless local area network is used to indicate that a priority of the wireless local area network that the home area operator of the user equipment allows the user equipment to access is lower than a priority of the wireless local area network that the roaming area operator allows the user equipment to access.

Based on the fourth aspect or the first possible implementation manner of the fourth aspect, in a second possible implementation manner of the fourth aspect, the message used to trigger the core network device to send the identifier of the wireless local area network and the priority information of the wireless local area network to the 3GPP access network entity includes: a service request that is from the user equipment and sent by the 3GPP access network entity; or a create session response sent by a data gateway.

Based on the second possible implementation manner of the fourth aspect, in a third possible implementation manner of the fourth aspect, the message used to trigger the core network device to send the identifier of the wireless local area network and the priority information of the wireless local area network to the 3GPP access network entity is the create session response sent by the data gateway; the receiving unit is further configured to receive an attach request that is from the user equipment and sent by the 3GPP access network entity; and the sending unit is further configured to send a create session request to the data gateway according to the attach request, so that the data gateway sends the create session response to the core network device.

In the used technical solutions provided in the embodiments of the present invention, a 3GPP access network entity of a roaming area operator to which UE roams acquires, from a core network device, an identifier of a WLAN and priority information corresponding to the WLAN, and delivers the identifier of the WLAN to the user equipment according to the priority information of the WLAN, so that when performing service transfer to the WLAN, the user equipment can access the WLAN according to priority of the WLAN.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
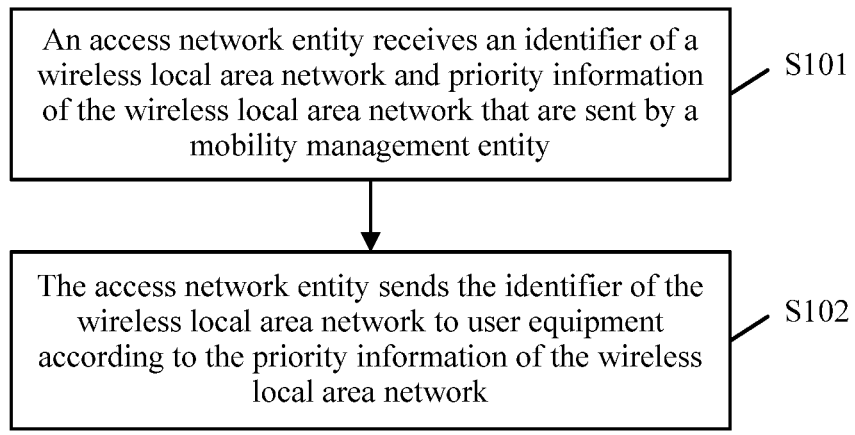
FIG. 1 is a schematic flowchart of an identifier interaction method disclosed in an embodiment.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments provide an identifier interaction method and a device, so that user equipment in a roaming state can select a wireless local area network that a home area operator of the user equipment allows the user equipment to access, so as to prevent the UE from being likely to preferentially access a WLAN that is not expected by the home area operator and/or a roaming area operator. A 3GPP access network entity in the present invention may be an evolved NodeB/a mobile communications system, or may be a combination of an evolved NodeB/a mobile communications system and a single radio controller (SRC), which is not limited in the embodiments of the present invention. If a network standard of the user equipment is a mobile communications system network, a terrestrial interface between the single radio controller and a mobility management entity is an S1 interface of a Long Term Evolution network standard, and an air interface between the single radio controller and the user equipment is a Uu interface. The single radio controller can communicate with the evolved NodeB/the mobile communications system. When the 3GPP access network entity in the present invention is a combination of the evolved NodeB/the mobile communications system and the single radio controller, for a downlink message, the single radio controller may receive the message from a previous node such as a mobility management entity or a serving gateway in a core network device, and forwards the message to the evolved NodeB/the mobile communications system; and for an uplink message, the evolved NodeB/the mobile communications system may forward the message received from the user equipment to the single radio controller. The following embodiments use the Long Term Evolution LTE network standard as an example for separate description in detail.

It should be noted that the 3GPP access network entity in the embodiments of the present invention is an access network entity in a roaming area in which the user equipment is located, and the core network device (such as an MME (mobility management entity), or an OAM (operation, administration and maintenance) system) is a core network device in the roaming area in which the user equipment is located. Actions of the core network device in the following can all be executed by the MME.

It should be noted that, the core network device in the roaming area may acquire, through an Sa6 interface, policy information of the home area operator from an HSS (Home Subscriber Server, home subscriber server) of the home area operator of the user equipment, which includes priority information of a wireless local area network configured by the core network device in the roaming area in the present invention; or in the present invention, the home area operator may notify the roaming area operator of policy information, and then the policy information is preconfigured in the core network device in the roaming area by the roaming area operator.

Referring to FIG. 1, FIG. 1 is a schematic flowchart of an identifier interaction method disclosed in an embodiment of the present invention. As shown in FIG. 1, the method may include the following steps.

S101. A 3GPP access network entity receives an identifier of a wireless local area network and priority information of the wireless local area network that are sent by a core network device, where a home area operator allows user equipment to access the wireless local area network.

In this embodiment of the present invention, the identifier of the wireless local area network may be an SSID (service set identifier), may be a BSSID (basic service set identifier), or may be an ESSID (extended service set identifier) or an HESSID (homogeneous extended service set identifier), which is not limited in this embodiment of the present invention.

In this embodiment of the present invention, the identifier of the wireless local area network is an identifier of a wireless local area network that a home area operator of the user equipment allows the user equipment to access, and/or an identifier of a wireless local area network that a roaming area operator of the user equipment allows the user equipment to access.

In an optional implementation manner, the identifier of the wireless local area network and the priority information of the wireless local area network may be carried in an initial context setup request sent to the 3GPP access network entity by the core network device. In this embodiment of the present invention, the identifier of the wireless local area network and the priority information of the wireless local area network may independently exist in the initial context setup request, or may exist in a handover restriction list (HRL) (as shown in Table 1) in the initial context setup request, which is not limited in this embodiment of the present invention. Alternatively, the priority information may be ranking information, that is, the 3GPP access network entity receives a list of identifiers of WLANs that a user is allowed to access, where the list includes the identifier of the wireless local area network that the home area operator of the user equipment allows the user equipment to access, and/or the identifier of the wireless local area network that the roaming area operator allows the user equipment to access, and a WLAN ranking closer to the beginning has a higher priority. For example, a list of identifiers of WLANs includes a WLAN A, a WLAN B, and a WLAN C, if the WLAN A and the WLAN B are WLANs that a home area operator allows user equipment to access, and the WLAN C is a WLAN that a roaming area operator allows the user equipment to access, a priority of the WLAN A is higher than that of the WLAN B, and a priority of the WLAN B is higher than that of the WLAN C. When accessing a WLAN, the UE may select a WLAN that has a highest priority.

Table 1 is a handover restriction list disclosed in this embodiment of the present invention, a WLAN Priority Indicator (priority information of a wireless local area network), WPI for short, in Table 1 is added priority information. The priority information is used to indicate a priority configuration of the wireless local area network that the home area operator of the user equipment allows the user equipment to access relative to the wireless local area network that the roaming area operator allows the user equipment to access, that is, the priority information may indicate that a priority is low, or may indicate that a priority is high. For example, o is used to indicate that a priority of the wireless local area network that the home area operator allows the user equipment to access is low, and 1 is used to indicate that a priority of the wireless local area network that the home area operator allows the user equipment to access is high; or it indicates that a priority of the wireless local area network that the home area operator of the user equipment allows the user equipment to access is higher than a priority of the wireless local area network that the roaming area operator allows the user equipment to access, provided that the priority information exists, where a name of the priority information is not limited.

S102. The 3GPP access network entity sends the identifier of the wireless local area network to the user equipment according to the priority information of the wireless local area network.

In this embodiment of the present invention, the 3GPP access network entity sends, to the user equipment according to the foregoing WPI priority information, an identifier of a wireless local area network used for service transfer. For example, if the priority information is used to indicate that a priority of a wireless local area network that a home area operator allows a user to access is high, a 3GPP access network entity selects only an identifier of the wireless local area network that the home area operator allows the user equipment to access, and delivers the identifier to the UE; alternatively, an identifier of a wireless local area network that a home area operator allows a user to access and an identifier of a wireless local area network that a roaming area operator allows a user to access are delivered together to the UE, but indicate, to the UE, that a priority of a wireless local area network that a home area operator of the UE allows to access is high. In this embodiment of the present invention, the 3GPP access network entity can select a wireless local area network according to information delivered by a core network device, and deliver an identifier of the wireless local area network to UE for service transfer, so that the user equipment can preferentially access a WLAN that a home area operator allows to access, which prevents a problem of a policy conflict between the home area operator and a roaming area operator.

TABLE 1

| HANDOVER RESTRICTION LIST | | | | |
|---|---|---|---|---|
| IE/Group Name | Presence | Range | IE type and reference | Semantics description |
| HPLMN | M | | PLMN Identify 9.2.4 | |
| WLAN Priority Indicator | | | | |
| >allowed WLAN Identifiers | | | | |
| Equivalent PLMN | | 0...<maxnoofEPLMNs> | | Allowed PLMNs in addition to Serving PLMN. This list corresponds to the list of "equivalent PLMNs list" as defined in TS 24.301[4] |
| >allowed WLAN SSIDs | | | | |

In this embodiment, the 3GPP access network entity receives at least one identifier of at least one wireless local area network and priority information of the at least one wireless local area network that are sent by the core network device, so that the 3GPP access network entity can send, to the user equipment according to the priority information of the at least one wireless local area network, an identifier of a wireless local area network used for service transfer.

Figure 2:
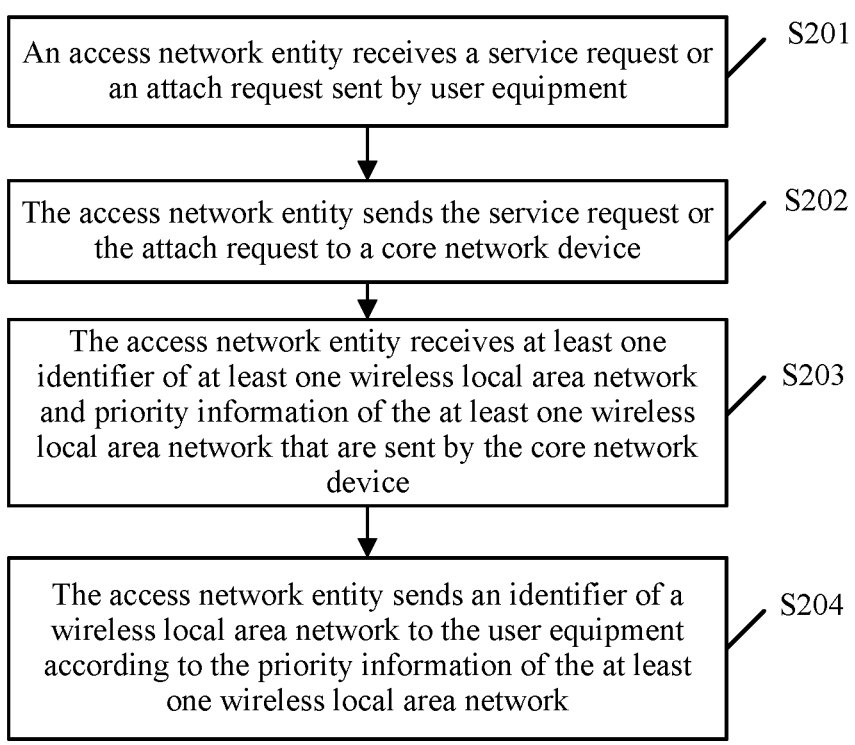
FIG. 2 is a schematic flowchart of another identifier interaction method disclosed in an embodiment.

Referring to FIG. 2, FIG. 2 is a schematic flowchart of another identifier interaction method disclosed in an embodiment of the present invention. As shown in FIG. 2, the method may include the following steps.

S201. A 3GPP access network entity receives a service request or an attach request sent by user equipment.

S202. The 3GPP access network entity sends the service request or the attach request to a core network device.

In this embodiment, the 3GPP access network entity sends the service request or the attach request to the core network device, so that the core network device sends an identifier of a wireless local area network and priority information of the wireless local area network to the 3GPP access network entity according to the service request or the attach request.

In this embodiment, if the 3GPP access network entity sends the service request to the core network device, after receiving the service request, the core network device sends the identifier of the wireless local area network and the priority information of the wireless local area network to the 3GPP access network entity. If the 3GPP access network entity sends the attach request to the core network device, after the core network device receives the attach request, the core network device sends a create session request to a data gateway by using a serving gateway; then the core network device receives a create session response that is sent by the data gateway by using the serving gateway; after receiving the create session response from the data gateway, the core network device sends the identifier of the wireless local area network and the priority information of the wireless local area network to the 3GPP access network entity.

S203. The 3GPP access network entity receives at least one identifier of at least one wireless local area network and priority information of the at least one wireless local area network that are sent by the core network device.

In this embodiment, the identifier of the wireless local area network may be an SSID, may be a BSSID, or may be an ESSID, or an HESSID, which is not limited in this embodiment of the present invention.

In this embodiment, an implementation method of the identifier of the wireless local area network and the priority information of the wireless local area network is shown in Table 1, or the priority information may be ranking information, that is, the 3GPP access network entity receives a list of identifiers of WLANs that a user is allowed to access, where the list includes an identifier of a wireless local area network that a home area operator of the user equipment allows the user equipment to access and/or an identifier of a wireless local area network that a roaming area operator allows the user equipment to access, and a WLAN ranking closer to the beginning has a higher priority. For example, a list of identifiers of WLANs includes a WLAN A, a WLAN B, and a WLAN C, if the WLAN A and the WLAN B are WLANs that a home area operator allows user equipment to access, and the WLAN C is a WLAN that a roaming area operator allows the user equipment to access, a priority of the WLAN A is higher than that of the WLAN B, and a priority of the WLAN B is higher than that of the WLAN C.

S204. The 3GPP access network entity sends, to the user equipment according to the priority information of the at least one wireless local area network, an identifier of a wireless local area network used by the user equipment for service transfer.

In this embodiment, if the priority information is a WPI shown in Table 1, the 3GPP access network entity sends the identifier of the wireless local area network to the user equipment according to the WPI. For example, if the WPI indicates that a priority of a WLAN that a home area operator allows user equipment to access is high, the 3GPP access network entity preferentially delivers only an identifier of the WLAN that the home area operator allows the user equipment to access; alternatively, an identifier of a WLAN that a home area operator allows user equipment to access, and an identifier of a WLAN that a roaming area operator allows the user equipment to access are both delivered simultaneously, but indicate to the user equipment that a priority of the WLAN that the home area operator allows to access is higher, for example, a WLAN that a home area operator allows user equipment to access is ranked at the beginning.

In this embodiment, a 3GPP access network entity sends, to a core network device, a service request or an attach request that is from user equipment, so that the core network device sends at least one identifier of at least one wireless local area network and priority information of the at least one wireless local area network to the 3GPP access network entity. The 3GPP access network entity receives the at least one identifier of the at least one wireless local area network and the priority information of the at least one wireless local area network that are sent by the core network device, so that the 3GPP access network entity sends, to the user equipment according to the priority information of the at least one wireless local area network, an identifier of a wireless local area network used for service transfer, and the UE can transfer a service to a corresponding WLAN according to a sequence (indicating a priority) in which the identifier of the wireless local area network is received. Because a core network device of a roaming area operator configures or sends all priorities of the wireless local area network, which can prevent the UE from preferentially accessing a WLAN that is not expected by the home area operator and/or the roaming area operator.

Figure 3:
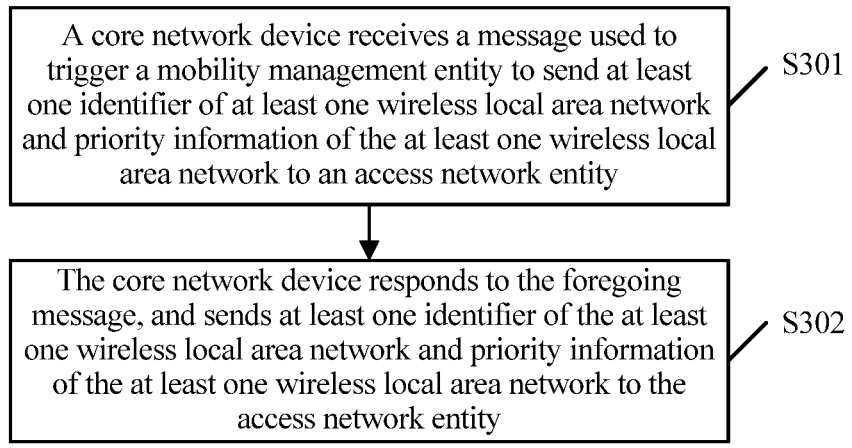
FIG. 3 is a schematic flowchart of still another identifier interaction method disclosed in an embodiment.

Referring to FIG. 3, FIG. 3 is a schematic flowchart of still another identifier interaction method disclosed in an embodiment. As shown in FIG. 3, the method may include the following steps.

S301. A core network device receives a message used to trigger the core network device to send at least one identifier of at least one wireless local area network and priority information of the at least one wireless local area network to a 3GPP access network entity.

In this embodiment, that a core network device receives a message used to trigger the core network device to send an identifier of a wireless local area network and priority information of the wireless local area network to a 3GPP access network entity may be that the core network device receives a service request that is from the user equipment and sent by the 3GPP access network entity, or that the core network device receives a create session response sent by a data gateway.

S302. The core network device responds to the foregoing message, and sends at least one identifier of the at least one wireless local area network and priority information of the at least one wireless local area network to the 3GPP access network entity.

In this embodiment, the core network device responds to the message, and sends an identifier of a wireless local area network and priority information of the wireless local area network to the 3GPP access network entity. The identifier of the wireless local area network and the priority information of the wireless local area network may be included in an HRL (handover restriction list). As shown in Table 1, the HRL is included in an initial context setup request that is sent by the core network device and received by the 3GPP access network entity, or the identifier of the wireless local area network and the priority information of the wireless local area network may be independent of the HRL and included in the initial context setup request, which is not limited in this embodiment.

In this embodiment, after receiving a message used to trigger a core network device to send at least one identifier of at least one wireless local area network and priority information of the at least one wireless local area network to a 3GPP access network entity, the core network device responds to the message, and sends at least one identifier of the at least one wireless local area network and priority information of the at least one wireless local area network to the 3GPP access network entity, so that the 3GPP access network entity can send, to user equipment according to received information, an identifier of a wireless local area network used for service transfer.

Figure 4:
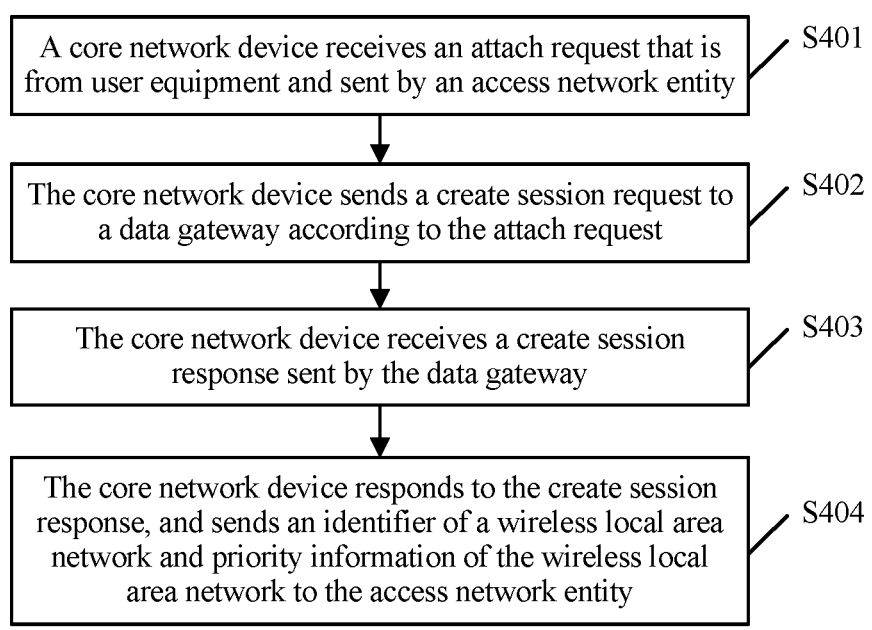
FIG. 4 is a schematic flowchart of yet another identifier interaction method disclosed in an embodiment.

Referring to FIG. 4, FIG. 4 is a schematic flowchart of yet another identifier interaction method disclosed in an embodiment of the present invention. As shown in FIG. 4, the method may include the following steps.

S401. A core network device receives an attach request that is from user equipment and sent by a 3GPP access network entity.

S402. The core network device sends a create session request to a data gateway according to the attach request.

In this embodiment, the core network device may send the create session request to the data gateway by using a serving gateway.

S403. The core network device receives a create session response sent by the data gateway.

In this embodiment, the core network device may receive, by using the serving gateway, the create session response sent by the data gateway, where the create session response is used to trigger the core network device to send an identifier of a wireless local area network and priority information of the wireless local area network to the 3GPP access network entity.

S404. The core network device responds to the create session response, and sends an identifier of a wireless local area network and priority information of the wireless local area network to the 3GPP access network entity.

Implementation of this embodiment can enable an access network entity in a roaming area to send, to user equipment, an identifier of a WLAN according to an identifier of a wireless local area network and priority information of the wireless local area network that are received.

Figure 5:
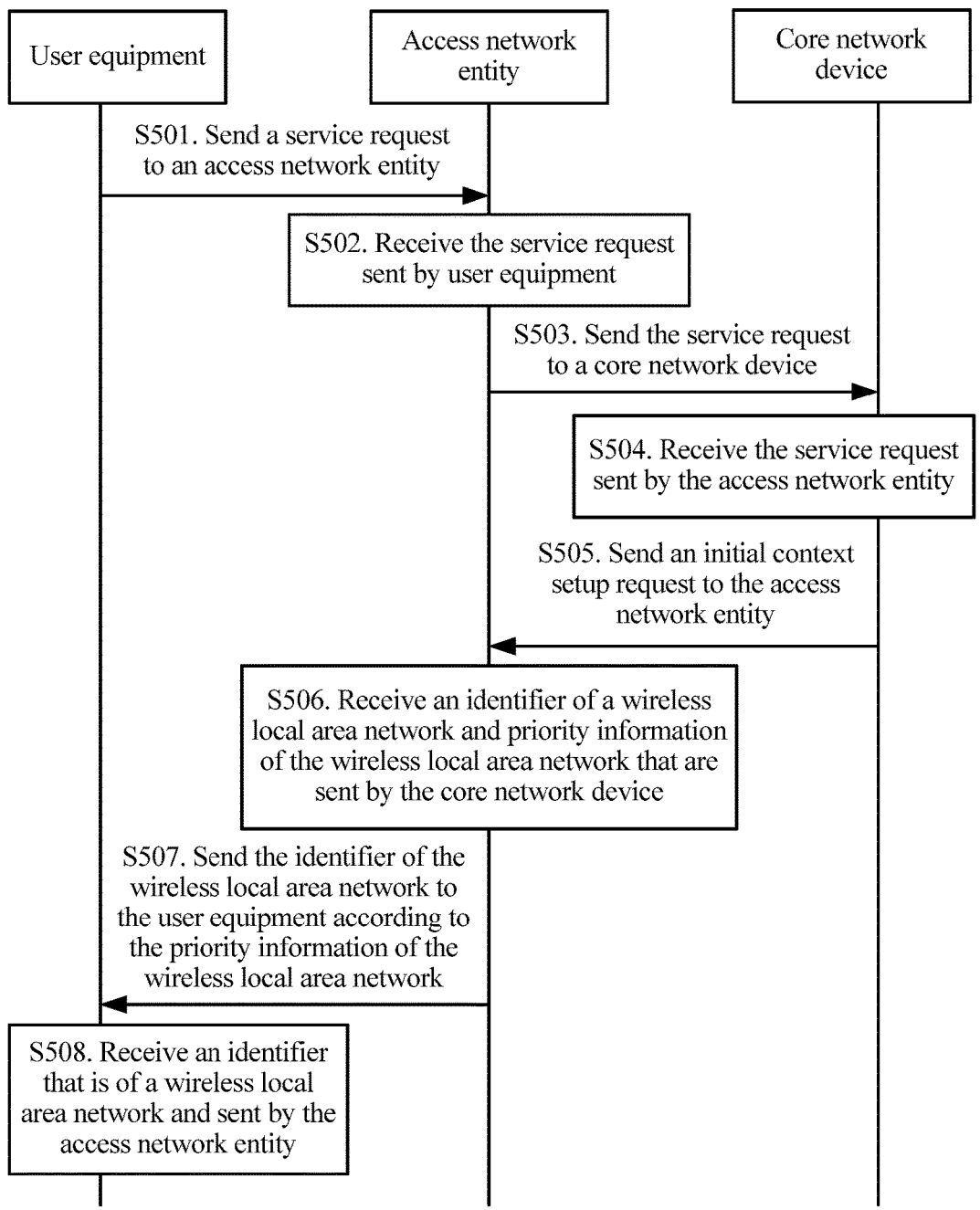
FIG. 5 is a schematic flowchart of still yet another identifier interaction method disclosed in an embodiment.

Referring to FIG. 5, FIG. 5 is a schematic flowchart of still yet another identifier interaction method disclosed in an embodiment. As shown in FIG. 5, the identifier interaction method may include the following steps.

S501. User equipment sends a service request to a 3GPP access network entity.

S502. The 3GPP access network entity receives the service request sent by the user equipment.

S503. The 3GPP access network entity sends the service request to a core network device.

S504. The core network device receives the service request sent by the 3GPP access network entity.

S505. The core network device sends an initial context setup request to the 3GPP access network entity.

In this embodiment, the initial context setup request includes an identifier of a wireless local area network and priority information of the wireless local area network, where the identifier of the wireless local area network and the priority information of the wireless local area network may independently exist in the initial context setup request, or may exist in a handover restriction list (as shown in Table 1) in the initial context setup request, which is not limited in this embodiment.

S506. The 3GPP access network entity receives an identifier of a wireless local area network and priority information of the wireless local area network that are sent by the core network device.

S507. The 3GPP access network entity sends the identifier of the wireless local area network to the user equipment according to the priority information of the wireless local area network.

S508. The user equipment receives an identifier of a target wireless local area network sent by the 3GPP access network entity.

Implementation of this embodiment of the present invention can enable an access network entity in a roaming area to send, to user equipment, an identifier of a WLAN according to an identifier of a wireless local area network and priority information of the wireless local area network that are received.

Figure 6A:
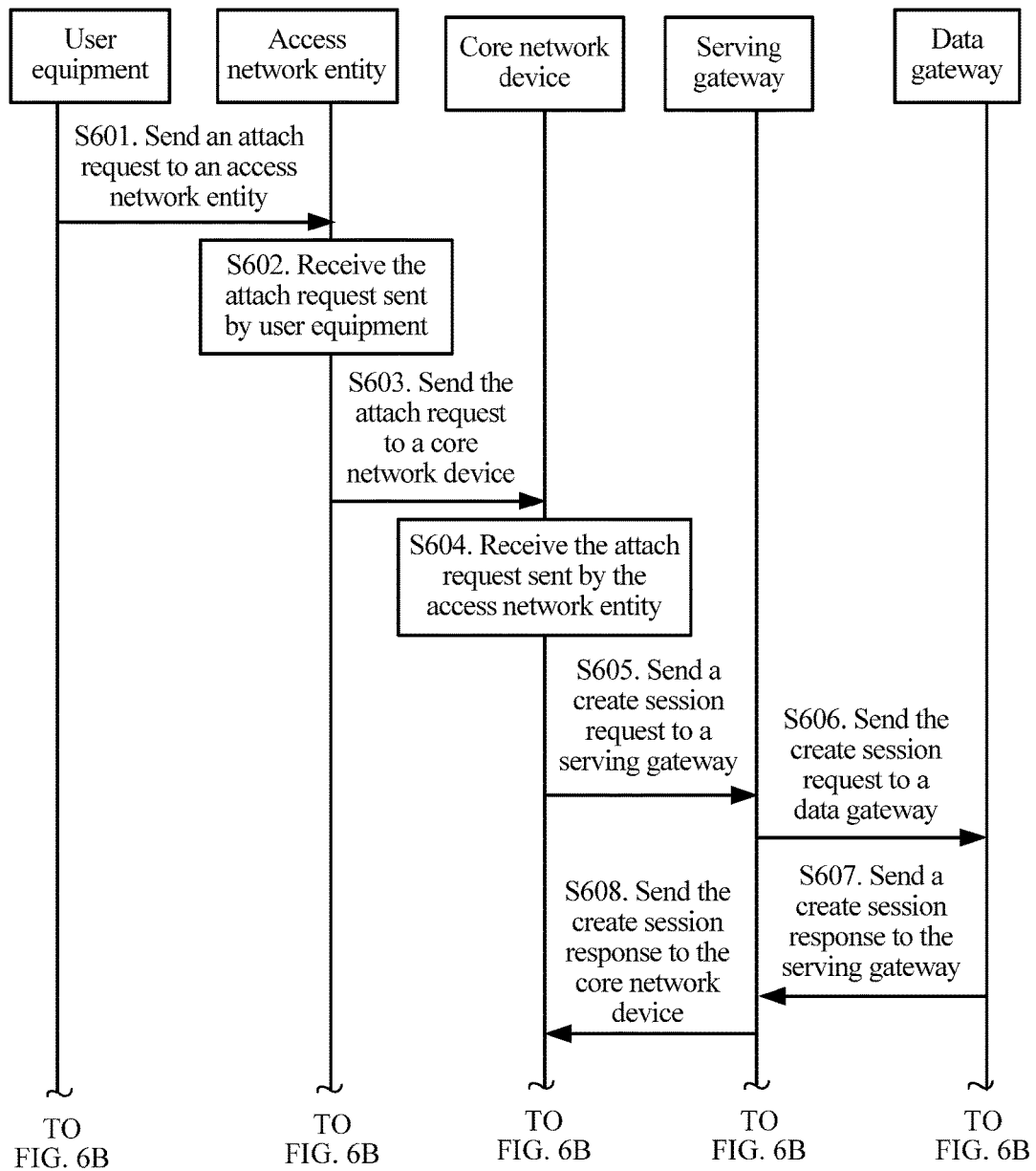
FIG. 6A and FIG. 6B is a schematic flowchart of a further identifier interaction method disclosed in an embodiment.
Figure 6B:
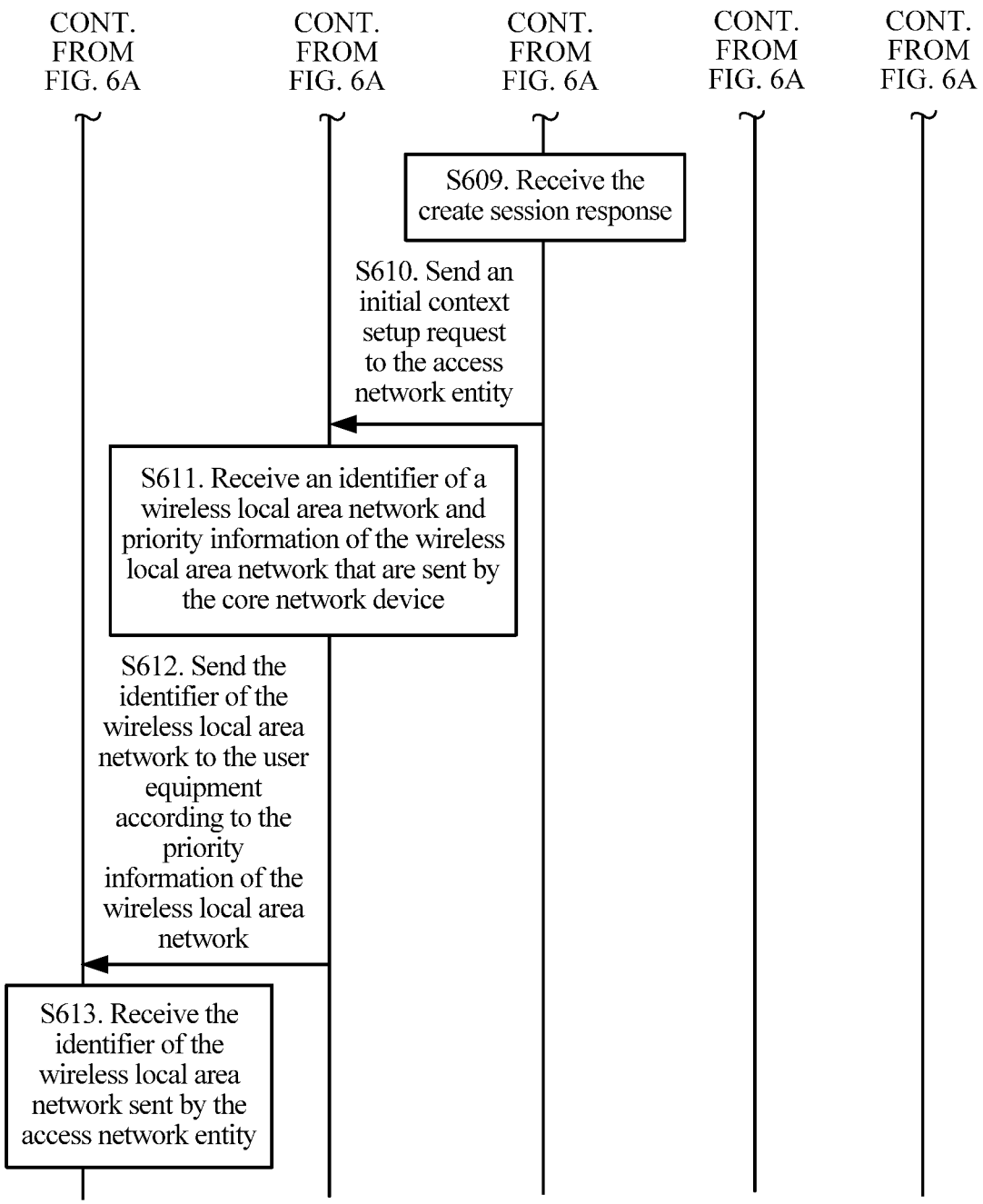

Referring to FIG. 6A and FIG. 6B, FIG. 6A and FIG. 6B is a schematic flowchart of a further identifier interaction method disclosed in an embodiment. As shown in FIG. 6A and FIG. 6B, the identifier interaction method may include the following steps.

S601. User equipment sends an attach request to a 3GPP access network entity.

S602. The 3GPP access network entity receives the attach request sent by the user equipment.

S603. The 3GPP access network entity sends the attach request to a core network device.

S604. The core network device receives the attach request sent by the 3GPP access network entity.

S605. The core network device sends a create session request to a serving gateway.

S606. The serving gateway sends the create session request to a data gateway.

S607. The data gateway sends a create session response to the serving gateway.

S608. The serving gateway sends the create session response to the core network device.

S609. The core network device receives the create session response.

S610. The core network device sends an initial context setup request to the 3GPP access network entity.

In this embodiment, the initial context setup request includes an identifier of a wireless local area network and priority information of the wireless local area network, where the identifier of the wireless local area network and the priority information of the wireless local area network may independently exist in the initial context setup request, or may exist in a handover restriction list (as shown in Table 1) in the initial context setup request, which is not limited in this embodiment.

S611. The 3GPP access network entity receives an identifier of a wireless local area network and priority information of the wireless local area network that are sent by the core network device.

S612. The 3GPP access network entity sends the identifier of the wireless local area network to the user equipment according to the priority information of the wireless local area network.

S613. The user equipment receives priority information of a target wireless local area network sent by the 3GPP access network entity.

Implementation of this embodiment can enable an access network entity in a roaming area to send, to user equipment, an identifier of a WLAN according to an identifier of a wireless local area network and priority information of the wireless local area network that are received.

Figure 7:
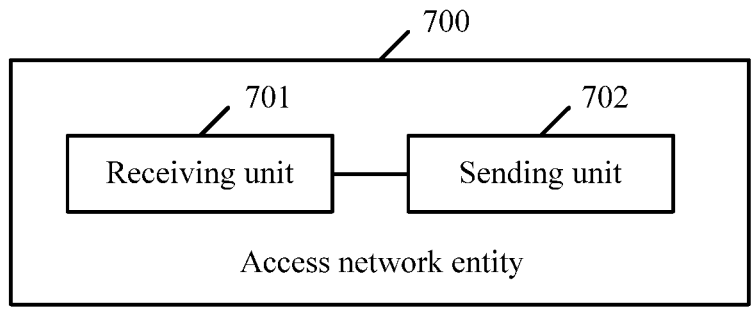
FIG. 7 is a schematic structural diagram of a 3GPP access network entity disclosed in an embodiment.

Referring to FIG. 7, FIG. 7 is a schematic structural diagram of a 3GPP access network entity disclosed in an embodiment. As shown in FIG. 7, the 3GPP access network entity 700 may include a receiving unit 701 and a sending unit 702.

The receiving unit 701 is configured to receive an identifier of a wireless local area network and priority information of the wireless local area network that are sent by a core network device.

In this embodiment, the identifier of the wireless local area network is an identifier of a wireless local area network that a home area operator of user equipment allows the user equipment to access, and/or an identifier of a wireless local area network that a roaming area operator allows the user equipment to access. The 3GPP access network entity 700 is a 3GPP access network entity in a roaming area in which the user equipment is located.

In this embodiment, the identifier of the wireless local area network may be an SSID, may be a BSSID, or may be an ESSID, or an HESSID, which is not limited in this embodiment.

In this embodiment, the priority information of the wireless local area network is used to indicate a configuration of a priority of a wireless local area network that the home area operator of the user equipment allows the user equipment to access relative to a priority of a wireless local area network that the roaming area operator allows the user equipment to access.

In an optional implementation manner, that the receiving unit 701 receives an identifier of a wireless local area network and priority information of the wireless local area network that are sent by a core network device may be that the receiving unit 701 receives an initial context setup request that is sent by the core network device, where the initial context setup request includes the identifier of the wireless local area network and the priority information of the wireless local area network. In this embodiment of the present invention, the identifier of the wireless local area network and the priority information of the wireless local area network may independently exist in the initial context setup request, or may exist in a handover restriction list (as shown in Table 1) in the initial context setup request, which is not limited in this embodiment of the present invention.

The sending unit 702 sends the identifier of the wireless local area network to the user equipment according to the priority information of the wireless local area network.

In another embodiment, the receiving unit 701 is further configured to receive a service request or an attach request sent by the user equipment.

The sending unit 702 is further configured to send the service request or the attach request to the core network device.

In this embodiment, if the sending unit 702 sends the service request to the core network device, after receiving the service request, the core network device sends the identifier of the wireless local area network and the priority information of the wireless local area network to the 3GPP access network entity 700. If the sending unit 702 sends the attach request to the core network device, after the core network device receives the attach request, the core network device sends a create session request to a data gateway by using a serving gateway; then the core network device receives a create session response that is sent by the data gateway by using the serving gateway; after receiving the create session response from the data gateway, the core network device sends the identifier of the wireless local area network and the priority information of the wireless local area network to the 3GPP access network entity 700.

Implementation of this embodiment can enable an access network entity in a roaming area to send, to user equipment, an identifier of a WLAN according to an identifier of a wireless local area network and priority information of the wireless local area network that are received.

Figure 8:
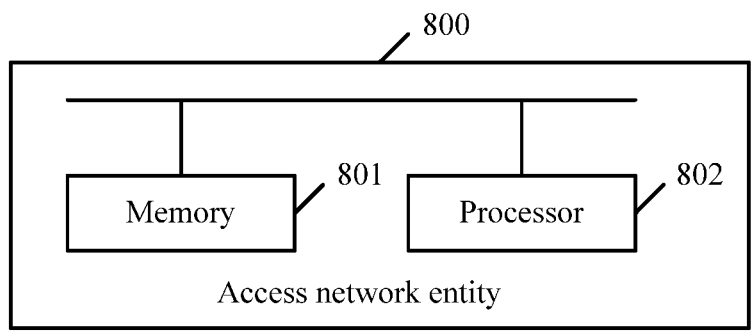
FIG. 8 is a schematic structural diagram of another 3GPP access network entity disclosed in an embodiment.

Referring to FIG. 8, FIG. 8 is a schematic structural diagram of another 3GPP access network entity disclosed in an embodiment. As shown in FIG. 8, the 3GPP access network entity 800 includes a memory 801 and a processor 802, where the memory 801 stores a set of program code, and the processor 802 is configured to invoke the program code stored in the memory 801 to execute the following operations: receiving an identifier of a wireless local area network and priority information of the wireless local area network that are sent by a core network device, where the identifier of the wireless local area network is an identifier of a wireless local area network that a home area operator of user equipment allows the user equipment to access, and/or an identifier of a wireless local area network that a roaming area operator allows the user equipment to access. The 3GPP access network entity 800 is a 3GPP access network entity in a roaming area in which the user equipment is located; and sending the identifier of the wireless local area network to the user equipment according to the priority information of the wireless local area network.

In an embodiment, before the processor 802 receives the identifier of the wireless local area network and the priority information of the wireless local area network that are sent by the core network device, the processor 802 invokes the program code stored in the memory 801 to further execute the following operations: receiving a service request or an attach request sent by the user equipment; and sending the service request or the attach request to the core network device, so that the core network device sends the identifier of the wireless local area network and the priority information of the wireless local area network to the 3GPP access network entity according to the service request or the attach request.

In an embodiment, a manner in which the processor 802 receives an identifier of a wireless local area network and priority information of the wireless local area network that are sent by a core network device is specifically: receiving an initial context setup request sent by the core network device, where the initial context setup request includes the identifier of the wireless local area network and the priority information of the wireless local area network.

Implementation of this embodiment can enable an access network entity in a roaming area to send, to user equipment, an identifier of a WLAN according to an identifier of a wireless local area network and priority information of the wireless local area network that are received.

Figure 9:
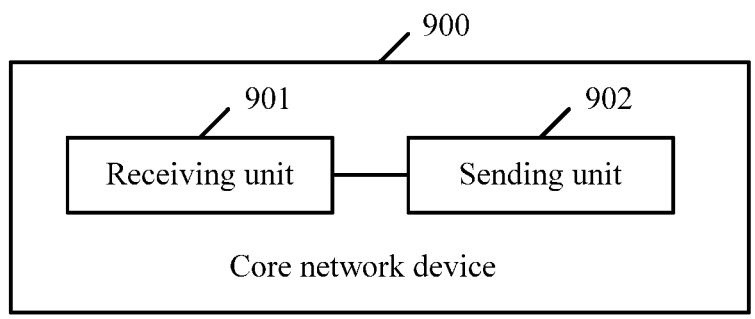
FIG. 9 is a schematic structural diagram of a core network device disclosed in an embodiment.

Referring to FIG. 9, FIG. 9 is a schematic structural diagram of a core network device disclosed in an embodiment. As shown in FIG. 9, the core network device 900 includes a receiving unit 901 and a sending unit 902.

The receiving unit 901 is configured to receive a message used to trigger the core network device 900 to send an identifier of a wireless local area network and priority information of the wireless local area network to a 3GPP access network entity.

In an optional implementation manner, that the receiving unit 901 receives a message used to trigger the core network device 900 to send an identifier of a wireless local area network and priority information of the wireless local area network to a 3GPP access network entity may be that the receiving unit 901 receives a service request that is from user equipment and sent by the 3GPP access network entity.

In this embodiment, the identifier of the wireless local area network may be an SSID, may be a BSSID, or may be an ESSID, or an HESSID, which is not limited in this embodiment.

In this embodiment, the priority information of the wireless local area network is used to indicate a configuration of a priority of a wireless local area network that a home area operator of the user equipment allows the user equipment to access relative to a priority of a wireless local area network that a roaming area operator allows the user equipment to access.

In another optional implementation manner, that the receiving unit 901 receives a message used to trigger the core network device 900 to send an identifier of a wireless local area network and priority information of the wireless local area network to a 3GPP access network entity may be that the receiving unit 901 receives a create session response sent by a data gateway.

In this embodiment, the wireless local area network is a wireless local area network that the home area operator of the user equipment allows the user equipment to access, and the 3GPP access network entity is a 3GPP access network entity in a roaming area in which the user equipment is located.

The sending unit 902 is configured to respond to the message, and send the identifier of the wireless local area network and the priority information of the wireless local area network to the 3GPP access network entity.

In another embodiment, if the message received by the receiving unit 901 is a create session response, the receiving unit 901 is further configured to receive an attach request that is from the user equipment and sent by the 3GPP access network entity.

The sending unit 902 is further configured to send a create session request to the data gateway according to the attach request.

In this embodiment of the present invention, the create session request is used to enable the data gateway to send the create session response to the core network device 900.

Implementation of this embodiment of the present invention can enable an access network entity in a roaming area to send, to user equipment, an identifier of a WLAN according to an identifier of a wireless local area network and priority information of the wireless local area network that are received.

Figure 10:
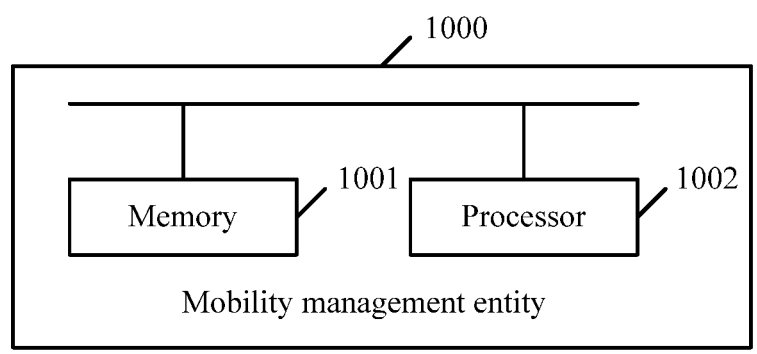
FIG. 10 is a schematic structural diagram of another core network device disclosed in an embodiment.

Referring to FIG. 10, FIG. 10 is a schematic structural diagram of another core network device disclosed in an embodiment. As shown in FIG. 10, the core network device 1000 includes a memory 1001 and a processor 1002, where the memory 1001 stores a set of program code, and the processor 1002 is configured to invoke the program code stored in the memory 1001 to execute the following operations: receiving a message used to trigger the core network device 1000 to send an identifier of a wireless local area network and priority information of the wireless local area network to a 3GPP access network entity, where the identifier of the wireless local area network is an identifier of a wireless local area network that a home area operator of user equipment allows the user equipment to access, and/or an identifier of a wireless local area network that a roaming area operator allows the user equipment to access, and the 3GPP access network entity is a 3GPP access network entity in a roaming area in which the user equipment is located; and responding to the message, and send the identifier of the wireless local area network and the priority information of the wireless local area network to the 3GPP access network entity, so that the 3GPP access network entity sends, to the user equipment, an identifier of a target wireless local area network to be selected by the user equipment.

In this embodiment, the identifier of the wireless local area network may be an SSID, may be a BSSID, or may be an ESSID, or an HESSID, which is not limited in this embodiment.

In this embodiment, the priority information of the wireless local area network is used to indicate a priority configuration of the wireless local area network that the home area operator of the user equipment allows the user equipment to access relative to the wireless local area network that the roaming area operator allows the user equipment to access.

In an embodiment, a manner in which the processor 1002 receives a message used to trigger the core network device 1000 to send an identifier of a wireless local area network and priority information of the wireless local area network to a 3GPP access network entity is specifically: receiving a service request that is from the user equipment and is sent by the 3GPP access network entity; or receiving a create session response sent by a data gateway.

In an embodiment, before the processor 1002 receives the create session response sent by the data gateway, the processor 1002 invokes the program code stored in the memory 1001 to further execute the following operations: receiving an attach request that is from the user equipment and sent by the 3GPP access network entity; and sending a create session request to the data gateway according to the attach request, so that the data gateway sends the create session response to the core network device.

Implementation of this embodiment can enable an access network entity in a roaming area to send, to user equipment, an identifier of a WLAN according to an identifier of a wireless local area network and priority information of the wireless local area network that are received.

It should be noted that, in the foregoing embodiments, the description of each embodiment has respective focuses. For a part that is not described in detail in an embodiment, reference may be made to related descriptions in other embodiments. In addition, a person skilled in the art should also appreciate that all the embodiments described in the specification are exemplary embodiments, and the related actions and modules are not necessarily mandatory to the present invention.

A sequence of the steps of the method in the embodiments may be adjusted, and certain steps may also be merged or removed according to an actual need.

Units in a router in the embodiments may be combined, classified, or removed according to an actual requirement, and may be implemented by using a universal integrated circuit, for example, a CPU (central processing unit) or by using an ASIC (application-specific integrated circuit).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The identifier interaction method and the device provided in the embodiments of the present invention are described in detail above. The principles and implementation manners of the present invention are described herein through specific examples. The description about the foregoing embodiments is merely provided to help understand the method and core ideas of the present invention. In addition, a person of ordinary skill in the art can make variations and modifications to the specific implementation manners and application scopes according to the ideas of the present invention. In conclusion, the content of specification shall not be construed as a limit to the present invention.

What is claimed is:

1. A method, comprising:

receiving, by a cellular telecommunications network access entity from a core network device of a roaming area operator, one or more identifiers of one or more wireless local area networks, and priority information of the one or more wireless local area networks, wherein the identifiers of the one or more wireless networks comprise one or more of an identifier of a wireless local area network that a home area operator allows a user equipment to access and an identifier of a wireless local area network that a roaming area operator of the user equipment allows the user equipment to access, the cellular telecommunications network access entity is in a roaming area in which the user equipment is located, and wherein the cellular telecommunications network access entity connects the user equipment to a cellular telecommunications network;

selecting, by the cellular telecommunications network access entity, an identifier of a preferred wireless local area network from the received one or more identifiers according to the priority information of the one or more wireless local area networks; and sending, by the cellular telecommunications network access entity, the identifier of the preferred wireless local area network to the user equipment.

2. The method according to claim 1, wherein the one or more identifiers of the one or more wireless networks comprise both an identifier of a wireless local area network that a home area operator allows the user equipment to access and an identifier of a wireless local area network that a roaming area operator of the user equipment allows the user equipment to access; and wherein the priority information of the one or more wireless local area networks indicates that a priority of the wireless local area network that the home area operator of the user equipment allows the user equipment to access is higher than a priority of the wireless local area network that the roaming area operator allows the user equipment to access.

3. The method according to claim 1, wherein the one or more identifiers of the one or more wireless networks comprise both an identifier of a wireless local area network that a home area operator allows the user equipment to access and an identifier of a wireless local area network that a roaming area operator of the user equipment allows the user equipment to access; and wherein the priority information of the one or more wireless local area networks indicates that a priority of the wireless local area network that the home area operator of the user equipment allows the user equipment to access is lower than a priority of the wireless local area network that the roaming area operator allows the user equipment to access.

4. The method according to claim 1, wherein selecting the identifier of the preferred wireless local area network from the received one or more identifiers according to the priority information of the one or more wireless local area networks comprises:

determining, by the cellular telecommunications network access entity, a highest priority wireless local area network of the one or more wireless local area networks according to the priority information of the one or more wireless local area networks; and selecting an identity corresponding to the highest priority wireless local area network as the identifier of the preferred wireless local area network.

5. The method according to claim 1, wherein before receiving the one or more identifiers of the one or more wireless local area networks and the priority information of the one or more wireless local area networks from the core network device, the method further comprises:

receiving, by the cellular telecommunications network access entity, a service request or an attach request sent by the user equipment; and sending, by the cellular telecommunications network access entity, the service request or the attach request to the core network device, wherein the service request or the attach request indicates to the core network device to send the one or more identifiers of the one or more wireless local area networks and the priority information of the one or more wireless local area networks to the cellular telecommunications network access entity according to the service request or the attach request.

6. The method according to claim 1, wherein receiving the one or more identifiers of the one or more wireless local area networks and the priority information of the one or more wireless local area networks from the core network device comprises:

receiving, by the cellular telecommunications network access entity, an initial context setup request sent by the core network device, wherein the initial context setup request comprises the one or more identifiers of the one or more wireless local area networks and the priority information of the one or more wireless local area networks.

7. The method according to claim 1, wherein receiving the one or more identifiers of the one or more wireless local area networks and the priority information of the one or more wireless local area networks from the core network device comprises:

receiving, by the cellular telecommunications network access entity, a list of identifiers of wireless local area networks that the user equipment is allowed to access, wherein the list includes one or more of the identifier of a wireless local area network that the home area operator allows the user equipment to access and the identifier of the wireless local area network that the roaming area operator allows the user equipment to access, and wherein a wireless local area network ranking closer to the beginning of the list has a higher priority.

8. A cellular telecommunications network access entity, comprising:
   a receiver;
   a transmitter; and
   a processor;
   wherein the cellular telecommunications network access entity is in a roaming area in which a user equipment is located;
   wherein the cellular telecommunications network access entity is configured to connect the user equipment to a cellular telecommunications network;
   wherein the receiver is configured to receive, from a core network device of a roaming area operator, one or more identifiers of one or more wireless local area networks, and priority information of the one or more wireless local area networks, wherein the one or more identifiers of one or more wireless local area networks comprise one or more of an identifier of a wireless local area network that a home area operator allows the user equipment to access and an identifier of a wireless local area network that a roaming area operator of the user equipment allows the user equipment to access; and
   wherein the processor is configured to:
      select an identifier of a preferred wireless local area network from the received one or more identifiers according to the priority information of the one or more wireless local area networks; and
      instruct the transmitter to send the identifier of the preferred wireless local area network to the user equipment.

9. The cellular telecommunications network access entity according to claim 8, wherein the one or more identifiers of the one or more wireless local area networks comprise both an identifier of a wireless local area network that a home area operator allows the user equipment to access and an identifier of a wireless local area network that a roaming area operator of the user equipment allows the user equipment to access; and
   wherein the priority information of the wireless local area network indicates that a priority of the wireless local area network that the home area operator of the user equipment allows the user equipment to access is higher than a priority of the wireless local area network that the roaming area operator allows the user equipment to access.

10. The cellular telecommunications network access entity according to claim 9, wherein the receiver is further configured to receive a service request or an attach request sent by the user equipment; and
   wherein the transmitter is further configured to send the service request or the attach request to the core network device, wherein the service request or the attach request indicates to the core network device to send the one or more identifiers of the one or more wireless local area networks and the priority information of the one or more wireless local area networks to the cellular telecommunications network access entity according to the service request or the attach request.

11. The cellular telecommunications network access entity according to claim 9, wherein the receiver being configured to receive the one or more identifiers of the one or more wireless local area networks and the priority information of the one or more wireless local area networks from the core network device comprises the receiver being configured to:
   receive an initial context setup request sent by the core network device, wherein the initial context setup request comprises the one or more identifiers of the one or more wireless local area networks and the priority information of the one or more wireless local area networks.

12. The cellular telecommunications network access entity according to claim 9, wherein the receiver being configured to receive the one or more identifiers of the one or more wireless local area networks and the priority information of the one or more wireless local area networks comprises the receiver being configured to receive a list of identifiers of wireless local area networks that the user equipment is allowed to access, wherein the list includes one or more of an identifier of a wireless local area network that the home area operator allows the user equipment to access, and an identifier of a wireless local area network that the roaming area operator allows the user equipment to access, and wherein a wireless local area network ranking closer to the beginning of the list has a higher priority.

13. The cellular telecommunications network access entity according to claim 8, wherein the one or more identifiers of the one or more wireless local area networks comprise both an identifier of a wireless local area network that a home area operator allows the user equipment to access and an identifier of a wireless local area network that a roaming area operator of the user equipment allows the user equipment to access; and
   wherein the priority information of the wireless local area network indicates that a priority of the wireless local area network that the home area operator of the user equipment allows the user equipment to access is lower than a priority of the wireless local area network that the roaming area operator allows the user equipment to access.

14. The cellular telecommunications network access entity according to claim 8, wherein the processor being configured to select the identifier of the preferred wireless local area network from the received one or more identifiers according to the priority information of the one or more wireless local area networks comprises the processor being configured to:
   determine a highest priority wireless local area network according to the priority information of the one or more wireless local area networks; and
   selecting an identity corresponding to the highest priority wireless local area network as the identifier of the preferred wireless local area network.

15. A non-transitory processor-readable medium having processor-executable instructions stored thereon, wherein the processor-executable instructions, when executed by a processor, instruct the processor to:
   receive, from a core network device of a roaming area operator, one or more identifiers of one or more wireless local area networks and priority information of the one or more wireless local area networks, wherein the one or more identifiers of the one or more wireless local area networks comprise one or more of an identifier of a wireless local area network that a home area operator allows a user equipment to access and an identifier of a wireless local area network that a roaming area operator of the user equipment allows the user equipment to access, and wherein the non-transitory processor-readable medium is comprised in a cellular telecommunications network access entity in a roaming area in which the user equipment is located, and wherein the cellular telecommunications network access entity is configured to connect the user equipment to a cellular telecommunications network;

select an identifier of a preferred wireless local area network from the received one or more identifiers according to the priority information of the one or more wireless local area networks; and send the identifier of the preferred wireless local area network to the user equipment.

16. The non-transitory processor-readable medium according to claim 15, wherein the processor-executable instructions to select the identifier of a preferred wireless local area network from the received one or more identifiers according to the priority information of the one or more wireless local area networks comprise processor-executable instructions for:

determining a highest priority wireless local area network according to the priority information of the wireless local area network; and selecting an identifier of the wireless local area network corresponding to the highest priority wireless local area network as the preferred wireless local area network.

17. The non-transitory processor-readable medium according to claim 15, further comprising processor-executable instructions for:

receiving a service request or an attach request sent by the user equipment; and sending the service request or the attach request to the core network device, wherein the service request or the attach request indicates to the core network device to send the one or more identifiers of the one or more wireless local area networks and the priority information of the one or more wireless local area networks to the cellular telecommunications network access entity according to the service request or the attach request.

18. The non-transitory processor-readable medium according to claim 15, wherein the processor-executable instructions to receive the one or more identifiers of the one or more wireless local area networks and the priority information of the one or more wireless local area networks from the core network device comprises processor-executable instructions for:

receiving an initial context setup request sent by the core network device, wherein the initial context setup request comprises the one or more identifiers of the one or more wireless local area networks and the priority information of the one or more wireless local area networks.

19. The non-transitory processor-readable medium according to claim 15, wherein the processor-executable instructions to receive the one or more identifiers of the one or more wireless local area networks and the priority information of the one or more wireless local area networks from the core network device comprises processor-executable instructions for:

receiving, by the cellular telecommunications network access entity, a list of identifiers of wireless local area networks that the user equipment is allowed to access, wherein the list includes one or more of an identifier of a wireless local area network that the home area operator allows the user equipment to access, and an identifier of a wireless local area network that the roaming area operator allows the user equipment to access, and wherein a wireless local area network ranking closer to the beginning of the list has a higher priority.

20. The non-transitory processor-readable medium according to claim 15, wherein the cellular telecommunications network access entity is operable in a 3rd Generation Partnership Project (3GPP) network.

* * * * *